July 28, 1970 — R. E. J. PUTMAN — 3,522,035

DETERMINING OPERATION OF FURNACE VESSEL

Filed Dec. 14, 1966

WITNESSES:
Bernard R. Giguey
James F. Young

INVENTOR
Richard E.J. Putman
BY P.M. Brodahl
ATTORNEY 3,522,035
DETERMINING OPERATION OF
FURNACE VESSEL
Richard E. J. Putman, Pittsburgh, Pa., assignor to Westinghouse Electric Corporation, Pittsburgh, Pa., a corporation of Pennsylvania
Filed Dec. 14, 1966, Ser. No. 601,803
Int. Cl. C21c 5/32
U.S. Cl. 75—60                 5 Claims

ABSTRACT OF THE DISCLOSURE

There is disclosed a method and apparatus for establishing the removal of a material from a vessel, such as the removal of carbon from the metal bath within a furnace vessel used for the production of steel, wherein the flow of exhaust gas from the furnace is established in relation to at least one constituent gas before and after the introduction of a known flow of that constituent gas, and then the removal of said material is established as the product of said exhaust gas flow and the measured percentage of said material in said exhaust gas. The established removal of said material enables a desired control of the vessel operation.

---

Figure 1:
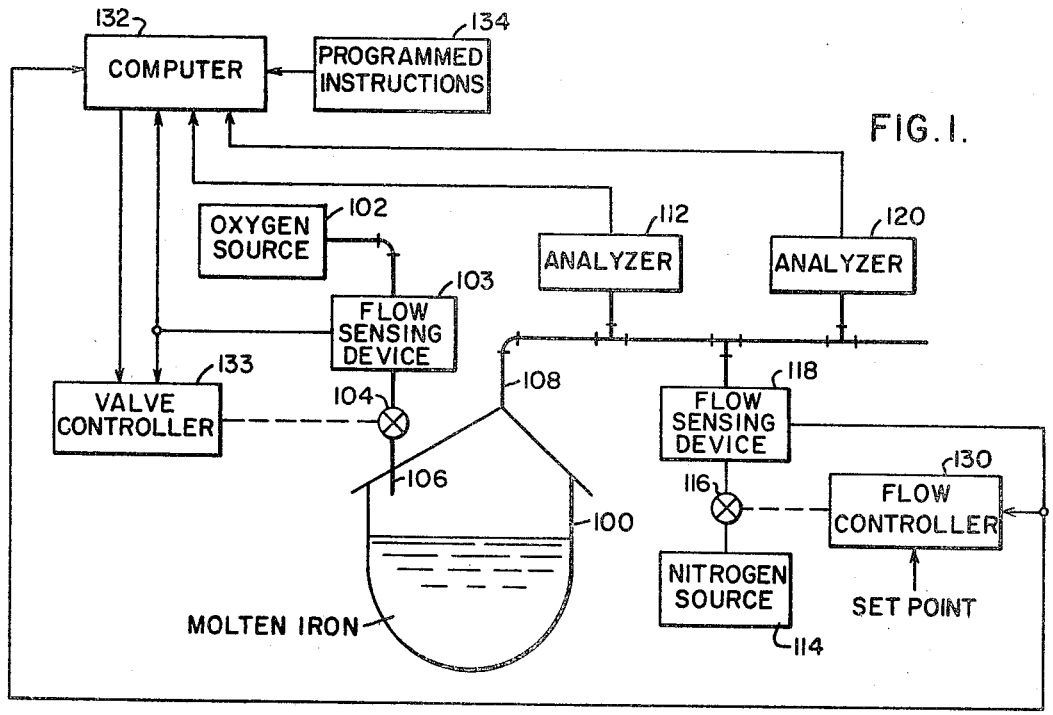

The present invention relates to a control technique and apparatus for the removal of a material from a vessel, for example the removal of carbon from a bath of molten metal such as is present within a basic oxygen furnace vessel used for the production of steel. More particularly, it relates to a control technique and apparatus for determining the flow of exhaust gases leaving the furnace vessel and then controlling the supply of oxygen into that vessel in accordance with the sensed carbon in the flow of gases leaving the vessel, to control the desired removal of carbon from the bath of molten metal.

It has been known in the prior art that the flow of a gas through a conduit can be measured by an orifice plate or by a fabricated venturi section. The orifice plate can be difficult to properly calibrate and requires considerable horsepower of energy to move the gas through the orifice plate. The fabricated venturi plate can be relatively difficult to calibrate to the required accuracy for the application herein discussed.

It is an object of the present invention to provide an improved, more accurate and better determination of the carbon removed through the exhaust gases leaving a basic oxygen furnace vessel.

It is another object of this invention to provide an improved control for the more accurate removal of carbon from a bath of molten metal in a more efficient manner by controlling better the oxygen supply to the furnace.

In accordance with the present invention a digital computer is connected to control the operation of a basic oxygen furnace; there are included a program schedule for the oxygen supply to the furnace vessel and exhaust gas analyzer devices for monitoring the percentage of carbon in the waste gases leaving the furnace vessel. A first gas analyzer is connected to the exhaust gas conduit to determine the percentage of a constituent gas known to be present in the initial exhaust gas from the furnace vessel, for example nitrogen; a known flow of substantially pure nitrogen is then introduced into the exhaust gas conduit; and a second gas analyzer is then connected to the exhaust gas conduit to determine the resulting percentage of nitrogen present in the exhaust gas conduit after the pure nitrogen has been introduced. From these nitrogen relationships a determination of the exhaust gas flow leaving the furnace vessel can be made.

At least the first gas analyzer also provides a measurement of the percentage of carbon present in the exhaust gas leaving the furnace vessel, so a determination of the total amount of carbon removed from the bath in the furnace vessel can be reached, since the flow of this exhaust gas has been determined by calculation with the computer and the product of gas flow times the percentage of carbon will give the amount of carbon removed.

The amount of carbon put into the furnace vessel is known, so a determination of the amount of carbon removed enables a determination of the amount of carbon remaining in the furnace vessel to enable the computer, through operation of its predetermined program instructions, to control the supply of oxygen into the furnace vessel for effecting the removal of a portion of the carbon and to terminate this supply of oxygen at the proper time to yield the desired concentration of carbon in the molten metal bath. As an alternate procedure, the removal of carbon can be calculated and then correlated with the supply of oxygen to the furnace vessel for controlling and then terminating the oxygen supply at the proper time to leave a desired concentration of carbon in the molten metal bath in the furnace vessel.

Figure 2:
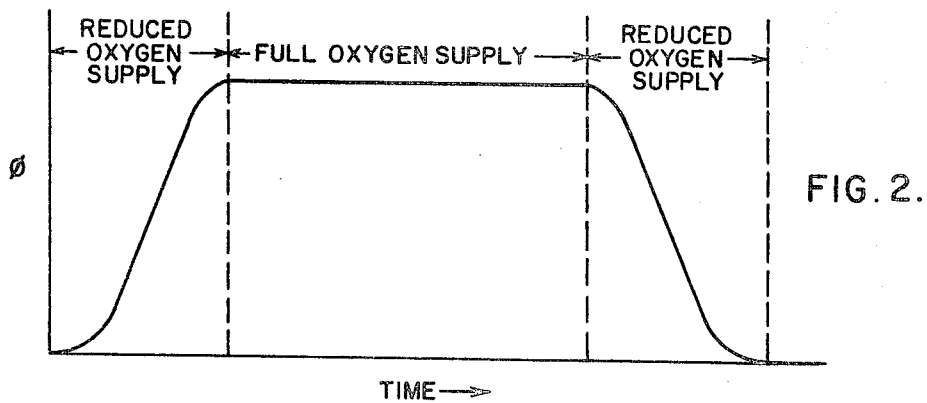

These and other objects and advantages of the present invention will be better understood in view of the following more detailed description including the drawings, wherein FIG. 1 shows a diagrammatic illustration of an application of the present invention to more accurately determine the carbon removal from the bath of molten metal within the furnace vessel, and FIG. 2 shows a curve plot of $\phi$, the efficiency of oxygen to remove carbon, versus time for a given molten metal bath treatment within a basic oxygen furnace.

In FIG. 1 there is shown a basic oxygen furnace vessel 100 for converting molten iron into steel by the supply of oxygen from an oxygen source 102 through a flow sensing device 103 and a control valve 104 by means of a lance 106 extending into the furnace 100 for blowing the oxygen into the molten iron bath within the furnace 100. For the purpose of determining the flow of exhaust gases within a flue conduit 108 connected to a hood 110 positioned above the furnace 100, there is provided a first gas analyder 112 operative to analyze the exhaust flue gas within the conduit 108 prior to the introduction of nitrogen from a nitrogen source 114 through a control valve 116 and through a flow sensing device 118. A second flue gas analyzer 120 is provided to analyze the resulting mixture including the nitrogen from the nitrogen source 114. A flow controller 130 receives a control signal from the flow sensing device 118 and compares this with a desired operation set point reference signal to regulate the opening of the valve 116 and thereby the flow of pure nitrogen into the conduit. The computer 132 receives the control signals from each of the analyzer 112, the analyzer 120, the flow sensing device 118 and the programmed instructions for the desired oxygen flow from a memory or similar storage device 134, which might even be a punched card or tape reader, for providing a control signal to the valve controller 133 to determine the operation of the valve 104 which controls the flow of oxygen from the oxygen source 102 into the molten iron bath through the lance 106.

In the operation of the control apparatus shown in FIG. 1 the computer 132, including hardware and programmed software components, calculates the unknown flow F of gas in the conduit 108 for regulating the operation of the valve 104 to determine the required amount and time duration of the oxygen feed from the oxygen source 102 through the lance 106 into the molten iron bath within the basic oxygen furnace 100.

The unknown flow F of gas in the conduit 108 has a chemical analysis in terms of at least oxygen, carbon containing gases such as carbon dioxide and nitrogen as sensed by the analyzer 112. A known flow of substantially 100% nitrogen controlled at a constant flow value is blended by injection into the exhaust gas stream and the analysis of the gas after blending shows a different percentage of at least oxygen, carbon gases and nitrogen by volume. These sensed percentage quantities of at least oxygen, carbon gases and nitrogen as well as the known flow of pure nitrogen into the exhaust gas conduit are supplied as signals to the computer 132.

The computed 132 as determined by its program instructions now calculates the unknown flow F of exhaust gases leaving the furnace vessel 100 and at the location of the first gas analyzer 112 through a volumetric balance of the exhaust gases relative to the injection of a known flow $F_1$, of pure nitrogen. The final and resulting gas flow at the location of the second gas analyzer 120 is $(F+F_1)$. The amount of nitrogen in the gas at the location of the first gas analyzer 112 is equal to $(N_1F)$, which is the percentage of nitrogen $N_1$ sensed by the first gas analyzer 112 multiplied by the flow F of gas at this location. The total amount of nitrogen in the exhaust gas at the location of the second gas analyzer 120 is $(N_1F+F_1)$, which is the amount of nitrogen leaving the furnace vessel plus the amount of pure nitrogen introduced from the nitrogen source 114 having the percentage of 100%. The second gas analyzed 120 will sense the percentage of nitrogen $N_2$ in the exhaust gas at the location of the second gas analyzer 120.

It should be readily understood that the amount of nitrogen in the exhaust gas at the location of the second gas analyzer 120 will be $N_1F+F_1=N_2(F+F_1)$. Since all quantities of the latter equation are known by measurement with the exception of the unknown flow F, the computer 132 can solve the equation for the unknown flow quantity F.

With the flow F in pounds per unit of time known, and the percentage of carbon in the exhaust gas at the location of the gas analyzer 112 being measured thereby, the amount of carbon removed from the molten metal bath within the furnace vessel per predetermined unit of time such as a minute can be determined. An integration of this carbon removed during the total time period of operation of the furnace and when oxygen is supplied from the oxygen source 102 can be readily determined by the computer 132.

The computer can be programmed in advance to know the total carbon input to the molten iron bath, so a subtraction of the calculated carbon removed during operation of the furnace, will provide a measurement of the carbon remaining within the molten metal bath. When the desired concentration of carbon within the bath is reached, the computer can terminate the flow of oxygen into the bath from the oxygen source 102.

It should be here noted that the gas analyzers 112 and 120 are conventional and well known devices, and can utilize the principle of absorption of infrared radiation for this purpose.

The present control apparatus is also adapted for operation to dynamically control the operation of the basic oxygen furnace 100. In FIG. 2 there is shown a curve plot of $\phi$, the number of points of carbon removed by 1000 cubic feet of oxygen or the efficiency of oxygen to remove carbon, versus time. The oxygen supplied through the lance 106 can be varied in amount by the valve 104 up to a maximum rate of about 20,000 cubic feet per minute. A point of carbon is 0.01% by weight of carbon. The computer 132 can be programmed to sample the amount of carbon removed from the molten metal bath every predetermined time period, such as every five seconds, and then calculate on a predictive basis in terms of the amount of oxygen supplied to the furnace as sensed by the flow sensing device 103 the actual position on the carbon removal curve shown in FIG. 2 of the current furnace operation. No integration of carbon removed as previously described above is here needed, since there is now no requirement to know the amount of carbon initially put into the furnace. The computer 132 can determine $\phi$ for every desired unit of time such as five seconds. The computer can provide a regulated and reduced supply of oxygen to the bath initially and until the uppermost and somewhat level portion of the FIG. 2 curve is reached for the purpose to reduce the slopping of the molten metal outside of the furnace vessel. The computer continues to calculate $\phi$ to determine changes in $\phi$ and then increases the supply rate of the oxygen during the operation of the furnace in the time period as shown in FIG. 2 that the curve is somewhat level. When the curve starts to drop off, the computer 132 then reduces the oxygen supply rate toward the end of the carbon removal operation, and when the curve is rapidly dropping off, since the carbon content here changes so rapidly that the desired control of same is somewhat more difficult. The computer 132 with its rapid amount of carbon calculation ability is ideally suited for the carbon removal control technique described for the dynamic control of the basic oxygen furnace.

It should be readily apparent to persons skilled in this art that many obvious modifications of the present invention can be made in the light of and within the scope of the present teachings.

I claim as my invention:

1. A method of determining the amount of a material removed from a vessel, comprising the steps of:
   measuring an initial percentage of a selected constituent gas within the exhaust gas leaving the vessel during a finite time period,
   measuring the percentage of said material within the exhaust gas leaving the vessel during said time period,
   introducing a known flow of said constituent gas having a known percentage purity into said exhaust gas leaving the vessel,
   measuring a subsequent percentage of said constituent gas within the exhaust gas after said introduction of said known flow of said constituent gas,
   establishing the flow of said exhaust gas initially leaving the vessel in relation to said initial and said subsequent percentages of said constituent gas and said known flow of said constituent gas,
   and establishing the amount of said material leaving the vessel during said time period as the product of said percentage of said material and the flow of said exhaust gas leaving the vessel.

2. The method of claim 1 wherein said material is carbon removed from a basic oxygen furnace vessel containing a known initial amount of carbon during decarbonization of a molten metal bath in said vessel, and including the step of:
   establishing the concentration of carbon remaining within the bath in accordance with the difference between said initial amount of carbon within said bath and the total amount of carbon removed during said decarbonization.

3. The method of claim 1 wherein said material is carbon removed from a basic oxygen furnace vessel during decarbonization through the supply of oxygen to a molten metal bath in said vessel, and including the steps of:
   establishing the efficiency of the removal of said carbon in accordance with the known supply of oxygen to said molten metal bath,
   and controlling the supply of oxygen to said molten metal bath in accordance with the change of said efficiency of carbon removal to provide a desired amount of carbon remaining in said molten metal bath.

4. Apparatus for measuring the removal of a first material from a vessel containing at least said first material and a second material, with said first and second materials being present in the exhaust leaving said vessel, including first exhaust analyzing means for establishing the percentage of said first material in said exhaust and the percentage of said second material in said exhaust, means for introducing a known supply of said second material having a known purity into said exhaust, second exhaust analyzing means for establishing the percentage of said second material in the exhaust after said introduction of said known supply of said second material, and means for establishing the amount of said first material in said exhaust in relation to said percentages of said first and second materials and said known supply of said second material.

5. The apparatus of claim 4, with said means for establishing the amount of said first material in said exhaust comprising a computer operative to calculate the supply of said exhaust relative to said first exhaust analyzing means and operative to calculate the amount of said first material as the product of said supply of said exhaust and said percentage of said first material in said exhaust.

References Cited

UNITED STATES PATENTS

| | | | |
|---|---|---|---|
| 3,118,759 | 1/1964 | Okaniwa et al. | 75—60 |
| 3,372,023 | 3/1968 | Krainer et al. | 75—60 |

L. DEWAYNE RUTLEDGE, Primary Examiner

G. K. WHITE, Assistant Examiner

U.S. Cl. X.R.

73—19; 266—35